United States Patent
Blackman et al.

(10) Patent No.: US 12,370,474 B2
(45) Date of Patent: Jul. 29, 2025

(54) SEPARATOR ELECTRICAL ANALYSIS

(71) Applicant: Cameron International Corporation, Houston, TX (US)

(72) Inventors: Nicholas H. Blackman, Katy, TX (US); Gary W. Sams, Spring, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 17/443,956

(22) Filed: Jul. 29, 2021

(65) Prior Publication Data
US 2022/0032215 A1   Feb. 3, 2022

Related U.S. Application Data

(60) Provisional application No. 62/706,085, filed on Jul. 31, 2020.

(51) Int. Cl.
*B01D 29/60* (2006.01)
*B01D 35/02* (2006.01)
*B01D 35/143* (2006.01)

(52) U.S. Cl.
CPC ............ *B01D 29/60* (2013.01); *B01D 35/02* (2013.01); *B01D 35/143* (2013.01); *B01D 2201/54* (2013.01)

(58) Field of Classification Search
CPC ...... B01D 29/60; B01D 35/02; B01D 35/143; B01D 35/06; B01D 35/00; B01D 37/046; B01D 37/048; B01D 37/04; B01D 2201/54; B01D 2201/58; G01N 1/00
USPC ........................................................... 210/85
See application file for complete search history.

(56) References Cited

U.S. PATENT DOCUMENTS

| | | | | |
|---|---|---|---|---|
| 2005/0103717 | A1* | 5/2005 | Jha | B01D 61/48 210/243 |
| 2011/0210077 | A1* | 9/2011 | Coulter | C02F 9/00 210/85 |
| 2012/0234694 | A1* | 9/2012 | Vecitis | B01D 35/06 204/264 |

OTHER PUBLICATIONS

Brochure—Canty Process Technology, Oil and Gas Exploration and Production, Jan. 1, 2016 (12 pages).
ETI—Electrotech, Inc—EST-100 Emulsion Stability Tester, Dec. 15, 2011 (1 pages).

* cited by examiner

*Primary Examiner* — Akash K Varma
(74) *Attorney, Agent, or Firm* — Jeffrey D. Frantz

(57) ABSTRACT

The use of electrical analyzers to monitor and control separation processes is described. The electrical analyzers monitor electromagnetic properties of materials being treated, and are used to adjust the separation process based on the changing electromagnetic properties. The electrical analyzers generally sample process fluid and apply a static or varying electric field to the process fluid while monitoring energy uptake of the process fluid from the electric field by measuring electrical parameters of the circuit. The changing electrical response of the process is related to changing process conditions and can be used to control the process.

25 Claims, 8 Drawing Sheets

SEPARATOR ELECTRICAL ANALYSIS

CROSS-REFERENCE TO RELATED APPLICATIONS

This patent application claims benefit of U.S. Provisional Patent Application Ser. No. 62/706,085, filed Jul. 31, 2020, which is entirely incorporated by reference herein.

FIELD

Embodiments of the present invention generally relate to electrical and mechanical separation of separable liquids. Specifically, methods and apparatus for controlling mechanical and electrical separators are described.

BACKGROUND

Oil/water separation is common in the hydrocarbon industry. In hydrocarbon recovery operations, water is commonly used to carry solids and liquids into and out of equipment and reservoirs for various purposes. The water frequently comes into contact with hydrocarbons such as oil, and can become intermingled with the hydrocarbon. When the operation is finished, water with hydrocarbon cannot be discharged to the environment without first removing the hydrocarbon, and oil cannot be transported without first removing water.

Separations are typically performed to separate the hydrocarbon from the water. As is commonly known, oil typically separates from water naturally. However, complete removal of water from oil can be hindered by surfactants, temperature, and oil viscosity. The properties of the oil and the water influence how quickly and completely the separation occurs. For example, in most cases oil will form an emulsion with water that can take some time to separate. The time required for water droplets dispersed in oil to diffuse and coalesce together depends on chemical and physical properties of the oil and water, droplet size of the water in the oil, and relative amounts of oil and water in the emulsion. Without the aid of any separation technology, water droplets and/or solid particles 100 microns in size normally require 30 minutes or more to separate adequately from oil.

Many technologies are therefore used to efficiently separate separable liquids, as well as separating solids from liquids. Electrical separation is one technique. A multi-phase mixture is charged to a vessel, and an electric field is established inside the vessel to encourage materials with different electrical properties to separate faster. Application of the electric field increases the rate of separation beyond the base level of gravitational separation.

Operators continue to seek lower costs, higher throughput operations and electrical separation is no exception. There is a continuing need to reduce the size, weight, and cost of liquids separation equipment while maintaining or improving the speed of separation.

SUMMARY

Embodiments described herein provide a separator that includes a separator vessel having a separator inlet, a first separator outlet, and a second separator outlet; and an electrical analyzer coupled to the separator vessel.

Other embodiments described herein provide a separator that includes a separator vessel having a separator inlet, a first separator outlet, and a second separator outlet; a separator power unit coupled to an electrode structure disposed in an interior of the separator vessel; and one or more electrical analyzers coupled to the separator vessel, each of the one or more electrical analyzers comprising an analyzer vessel having an electrode pair disposed in an interior of the analyzer vessel; and a time-varying voltage analyzer power unit coupled to the electrode pair.

Other embodiments described herein provide a method that includes separating a multi-phase fluid in an electrical separator; sensing an electrical property of the multi-phase fluid upstream of the electrical separator; and controlling the electrical separator based on the electrical property.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
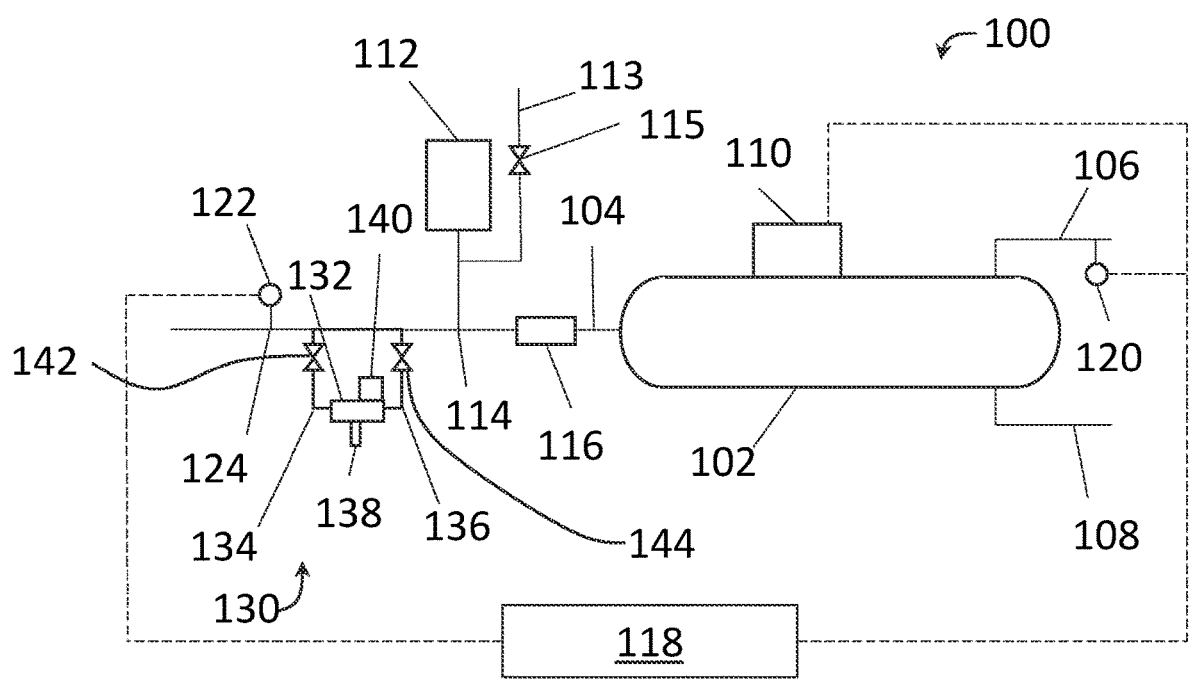
FIG. 1 is a schematic side view of a separator according to one embodiment.

Methods and apparatus for controlling fluid separators and fluid separation processes using electrical analyzers are described herein. FIG. 1 is a schematic side view of a separator 100 according to one embodiment. The separator 100 includes a separation vessel 102, which has a separator inlet 104, a first separator outlet 106 and a second separator outlet 108. A separator power unit 110 is coupled to the separation vessel 102. In operation, a multi-phase mixture is provided to the separation vessel 102 through the separator inlet 104. The separator inlet 104 is shown here at the side of the separation vessel 102, but the separator inlet 104 could be located at any convenient location. For example, in some cases, the separator inlet 104 is located in a lower part of the separation vessel 102, near or along the bottom of the vessel. The separator inlet 104 can be located at an end of the separation vessel 102, as shown here, in the middle of the separation vessel 102, or any convenient location between the end and the middle of the separation vessel 102. Distributors (not shown) can be located inside the separation vessel 102 to flow the multi-phase mixture into the separation vessel 102 in any desired pattern.

The multi-phase mixture includes liquids that can be separated into different liquid phases, potentially along with solids and gases. The multi-phase mixture flows into the separation vessel 102, where an electric field is applied using the separator power unit 110. The separator power unit 110 may be a static unit that creates a static electric field within the vessel or a variable unit that creates a time-varying electric field within the vessel. The static unit can be a DC unit or an AC unit with electronics that convert the AC output voltage to DC or quasi-static voltage. The time-varying unit can be a pulsed-DC unit, a modulated DC unit, or an AC unit, which may also be modulated. A modulated DC unit can be modulated as to amplitude, waveform (i.e. using different types of voltage transitions), and frequency, but typically establishes an electric potential at one or more values that are constant for a period of time, for example transitioning, according to a specified voltage transitions, between a neutral (zero) electric potential that is constant for a first period of time and a non-neutral value that is constant for a second period of time. An AC unit outputs continuously varying voltage of two or more alternating polarities, which can be amplitude-modulated, frequency-modulated, and waveform-modulated. In all cases of modulation, the modulation can also be subject to a frequency.

The separator power unit 110 typically includes a transformer to provide a target voltage or voltage amplitude. The separator power unit 110 may also include electronic components to condition the voltage output, such as switching circuits, control circuits, and filter circuits. Microprocessor-based control circuits can be used to apply various advanced modulation techniques to optimize application of electric fields based on fluid properties. The separator power unit 110 may include more than one power source, for example more than one transformer, to produce voltage outputs that can be mixed, if desired, or applied at different locations of the separation vessel 102 to produce space-varying electric fields, which may be in addition to time-varying electric fields. Such arrangements can be valuable where fluid composition changes with flow through the separation vessel 102. For example, as fluid phases separate within the separation vessel 102 while flowing along the major axis of the vessel, composition of the fluid phases changes along a coordinate of the separation vessel 102 defined along the major axis thereof. Application of different electric fields at different locations along the coordinate of the separation vessel 102 can be valuable to adapt electrical conditions to the changing composition.

It should be noted that electrical separation can be used in vessels that do not feature horizontal flow. In general, the fluid mixture is provided to a separation vessel, small droplets of water are coalesced in the vessel with the aid of electric fields as described above, and the water droplets reach a size that facilitates rapid downward movement of water droplets to gather in the bottom of the vessel. Oil flow is generally upward, as water collects and flows downward according to gravitational potential. Such separations can be aided by chemical separation aids. Gravitational potential results in separation of fluids according to density. Density separation can also be accomplished in rotating vessels using the force of rotational momentum change to cause separation by density. Electrical analysis of fluid mixtures, as described herein, can be used to determine fluid properties for control and optimization of any fluid separation process.

Referring again to FIG. 1, the separated liquid phases are withdrawn from the separation vessel 102 through the first separator outlet 106 and the second separator outlet 108. Typically, the electric field is employed to accelerate gravitational, or other density-based separation, for example between an oil phase and a water phase, but some embodiments of fluid separation processes are predominantly driven by electrical means and not by gravitational or density means, while some separation processes rely only on gravity, and others only on density. In any event, a first liquid phase is withdrawn from the first separator outlet 106 and a second liquid phase is withdrawn from the second separator outlet 108.

Here, the separator 100 is shown as a vessel oriented for horizontal flow from one side of the vessel 102 to the other side of the vessel 102. The separator inlet 104 is located a first end of the vessel 102, while the separator outlets 106 and 108 are located at a second end of the vessel 102, opposite from the first end. The technology described herein can be equally applied to a separator oriented for vertical flow through the separator vessel, with feed at the bottom and at least one outlet at the top. In a vertically oriented fluid separator, outlet streams will be vertically separated to provide outlets for vertically separated fluids, so the vertically oriented fluid separator may have a first outlet at the top of the vessel and a second outlet near the bottom of the vessel. In such cases, fluids entering with the feed will be separated from the bottom outlet using internal structures such as weirs and baffles, or merely by spacing the feed location away from the bottom outlet. For example, the feed location may be a short distance from the bottom of the vessel while the bottom outlet is at the bottom of the vessel to prevent entrainment of material from the feed stream in the bottom outlet.

The separator 100 is controlled to ensure quality of the first or second liquid phase remains within a tolerance, or if one of the first or second liquid phases departs from a tolerance range, to return the stream to the tolerance range. Quality is usually defined or understood in terms of concentration of a key component in either stream. For example, where oil and water are being separated, quality may be defined according to some measure of water in the separated oil withdrawn from the first separator outlet 106. This can be weight-percent of water, electrical conductivity, turbidity, or another indication of water in the oil. The same types of metrics can be used for oil in the water withdrawn from the second separator outlet 108. Temperature, pressure, flow rate, and any of the various operating parameters of the separator power unit 110 described above, can be adjusted to control operation of the separator 100 and to influence the quality metrics described above. In addition, chemical separation aids can be added to the multi-phase mixture, either in the separator inlet 104 or into the separation vessel 102 itself. In the separator 100, a source of chemical separation aid 112 is coupled to the separator inlet 104 at a separation aid feed location 114. An optional additional fluid line 113 can be used to add a compatible fluid, such as water, to the separator feed to aid in dispersion of the separation aid or in general performance of the separator 100. Flow rate of the additional fluid can be controlled using an additional fluid control valve 115. A mixer 116 can be disposed in the separator inlet 104 between the separation aid feed location 114 and the separation vessel 102 to disperse the chemical separation aid from the source 112 into the multi-phase mixture flowing through the separator inlet 104. The mixer 116 can be a valve, an orifice, a static mixer, a power mixer, or any combination thereof.

Control of the separator 100 is typically achieved using a controller 118 coupled to various control devices of the separator 100. For example, the controller 118 can be operatively coupled to control valves (not shown) to control flow rates of multi-phase mixture, chemical separation aid, first fluid outlet, and second fluid outlet. The controller 118 can also be coupled to temperature and pressure control devices (not shown). Sensors can be deployed throughout the separator 100, and operatively coupled to the controller 118, to provide information to the controller 118 to facilitate controlling the separator 100. The sensors are typically temperature, pressure, and composition (or composition indication) sensors, and can also include electrical sensors to sense changing loads on the separator power unit 110. Such sensors (not shown) may be inside the power unit 110 or coupled to electrical leads outside the power unit 110.

An outlet quality sensor 120 is coupled to the first separator outlet 106 in FIG. 1. Such arrangements are frequently used where the separator 100 is used to separate an aqueous fluid (i.e. produced water) from a hydrocarbon fluid (i.e. crude oil). The outlet quality sensor 120, in such cases, is a water and solids sensor (commonly referred to as a "basic sediment and water" or "BS&W" sensor). The outlet quality sensor 120 can be any sensor that responds to composition changes, and quality sensors can be coupled to the second separator outlet 108 as well. An inlet quality sensor 122, which can be the same type sensor as the outlet quality sensor 120, or a different type composition sensor, is also coupled to the separator inlet 104 in FIG. 1 at an inlet quality sensor location 124, where the separation aid feed location 114 is between the inlet quality sensor location 124 and the separation vessel 102. Each of the inlet quality sensor 122 and the outlet quality sensor 120 is operatively coupled to the controller 118 to provide information for controlling the separator 100. It should be noted that, in addition to, or instead of, the quality sensor 120, a second electrical analyzer can be coupled to the first separator outlet 106 to provide more information regarding performance of the separator 100.

The electric field may be applied to the multi-phase mixture in the separation vessel 102 in a number of ways. In one embodiment, electrical power is coupled to the wall of the separation vessel 102. In another embodiment, an electrode is disposed in the interior of the separation vessel 102 and electrically coupled to the separator power unit 110 as part of a power circuit emanating from the separator power unit 110. The electrode may be coupled to the power side of the circuit or to the return side of the circuit. In such a case, the wall of the separation vessel 102 can serve as a second electrode. Alternately, a pair of electrodes can be disposed in the interior of the separation vessel 102, with one electrode coupled to the power side of the power circuit and another electrode coupled to the return side of the power circuit. Alternately, several pairs of electrodes can be disposed in the interior of the separation vessel 102, each pair of electrodes defining an independent power circuit. In such cases, each pair of electrodes can be electrically coupled to one power unit, or pairs of electrodes can be electrically coupled to different power units. Electrical couplings between power units and electrode pairs can be one-to-one, one-to-many, many-to-one, or many-to-many in any convenient ratio.

Feedback control is commonly performed in separation processes using separators, like the separator 100, that rely on only gravity or rotation to separate fluids, that use electric fields to accelerate mechanical or gravitational separation, or that use predominantly electric fields to separate fluids. The quality and precision of feedback control suffers from issues of time, mainly where the effect of control is detected after the control is applied. Feed-forward control can often reduce or eliminate such issues by predicting the effect of control before the control is applied. To that end, the separator 100 includes a feed electrical analyzer 130 to analyze electrical properties of the multi-phase mixture flowing through the separator inlet 104. The feed electrical analyzer 130 has an analyzer vessel 132, an analyzer inlet 134 coupled between the separator inlet 104 and the analyzer vessel 132, and an analyzer outlet 136 coupled between the separator inlet 104 and the analyzer vessel 132. Thus, in the case of FIG. 1, a slipstream of the multi-phase mixture is taken from the separator inlet 104 and returned to the separator inlet 104 after analysis. Alternately, the analyzer outlet 136 could be coupled to an alternative disposition and not coupled to the separator inlet 104. The feed electrical analyzer 130 has an analyzer power unit 138 coupled to the analyzer vessel 132 to apply electric power to the analyzer vessel 132. The analyzer power unit 138 has at least one power source, which may be an AC or DC source, and may have more than one power source, which may all be AC or DC, or which may be a mixture of AC and DC power sources, and may individually be steady state or time-varying. As shown and described further below, a similar electrical analyzer can be used at the separator outlet 106, potentially in conjunction with the electrical analyzer 130 to provide a basis to compare the inlet and outlet fluids and monitor performance of the separator 100.

The feed electrical analyzer 130 includes one or more electrical sensors 140 to sense electrical properties of the material inside the analyzer vessel 132. Electrical sensors may be coupled to electrical conduits from the analyzer power unit 138 to the analyzer vessel 132 to sense electrical loads, or electrical sensors may be coupled to the analyzer vessel 132 itself to sense electrical response of the mixture in the analyzer vessel 132. The electrical sensors may be voltage sensors, current sensors, capacitance sensors, impedance sensors, or other types of electrical sensors.

An inlet valve 142 is disposed in the analyzer inlet 134 to control when a sample is collected from the separator inlet 104. The valve 142 may be remotely operated. When the valve 142 is opened, a portion of the multi-phase mixture in the separator inlet 104 is routed through the analyzer inlet 134 to the analyzer vessel 132. Flow may be continuous through the analyzer inlet 134, the analyzer vessel 132, and the analyzer outlet 136, or the valve 142 may be closed during analysis of the sample. An outlet valve 144 is disposed in the analyzer outlet 136 to allow the analyzer vessel 132 to be isolated from the separator inlet 104. For a continuous flow analyzer, the valves 142 and 144 may both be open during sampling and analysis, so multi-phase mixture is flowing through the analysis vessel 132 while readings are taken from the electrical sensors 140. Alternately, flow can be maintained for a flow duration, and then the valves 142 and 144 can be closed while readings are taken from the electrical sensors 140.

Readings from the electrical sensors, along with temperature, pressure, and analyzer power unit parameters, are relayed to the controller 118 (for simplicity, dotted lines connecting the analyzer power unit and electrical sensors to the controller are omitted from FIG. 1). The controller 118 uses the information from the feed electrical analyzer 130 to adjust operation of the separator 100 for optimum separation efficiency. For example, the controller 118 can be operatively coupled to the power unit 110 to control the power unit 110 based on signals received from the sensors 120 and 122.

It should be noted that the electrical analyzer described above can be used for horizontally-oriented separators and for vertically-oriented separators, and anything between vertical and horizontal. The electrical analyzer can be used at the inlet of the separator or at an outlet of the separator. Electrical analyzers can also be used to sample fluids from the interior of the vessel, especially around the oil/water interface in oil/water separation processes. Electrical analyzers can be used with any type of fluid separators, operating according to any separation principle to monitor composition of fluid mixtures with components having different electrical properties. Such separators include electrical separators, gravitational separators, rotational separators, and combinations thereof (i.e. separators using a combination of separation principles).

Electrical analyzers can be configured to detect any electrical property, or combination thereof, and calibrated to resolve composition of fluid mixtures containing fluids with very different electrical properties where the predominant fluid is an electrically resistant fluid such as oil, where the predominant fluid is an electrically conductive fluid such as water or brine, or where similar quantities of two such fluids exist in the mixture. If a wide range of fluid compositions and properties is to be measured at a single location, multiple electrical analyzers can be coupled at the location and configured and calibrated for different ranges of properties to detect composition over a very wide range commensurate with the calibrated ranges of the analyzers. For example, a first electrical analyzer can be configured and calibrated to resolve composition of a high-conductivity mixture while a second electrical analyzer is configured and calibrated to resolve composition of a low-conductivity mixture. The two electrical analyzers can be used to monitor composition of a fluid mixture that swings from high conductivity to low conductivity. Alternately, where the fluids in a mixture are more distinguishable by another electrical property, the two electrical analyzers can be configured and calibrated for different ranges of the electrical property to broaden the range of detection. In one example, where a fluid mixture having different fluids with different values of an electrical property is separated into a first fluid having a first value of the electrical property and a second fluid having a second value of the electrical property, a first electrical analyzer can be configured and calibrated to resolve the electrical property in a first range compatible with the first fluid and a second electrical analyzer can be configured and calibrated to resolve the electrical property in a second range compatible with the second fluid.

The separation aid feed location 114 is shown here downstream of the electrical analyzer 130. That is, the separation aid feed location 114 is shown downstream of the location at which the analyzer inlet 134 connects to the separator inlet 104 and downstream of the location at which the analyzer outlet 136 connects to the separator inlet 104. The separation aid feed location 114 could, alternately, be located upstream of the electrical analyzer 130, that is upstream of the location at which the analyzer inlet 134 connects to the separator inlet 104.

Figure 2:
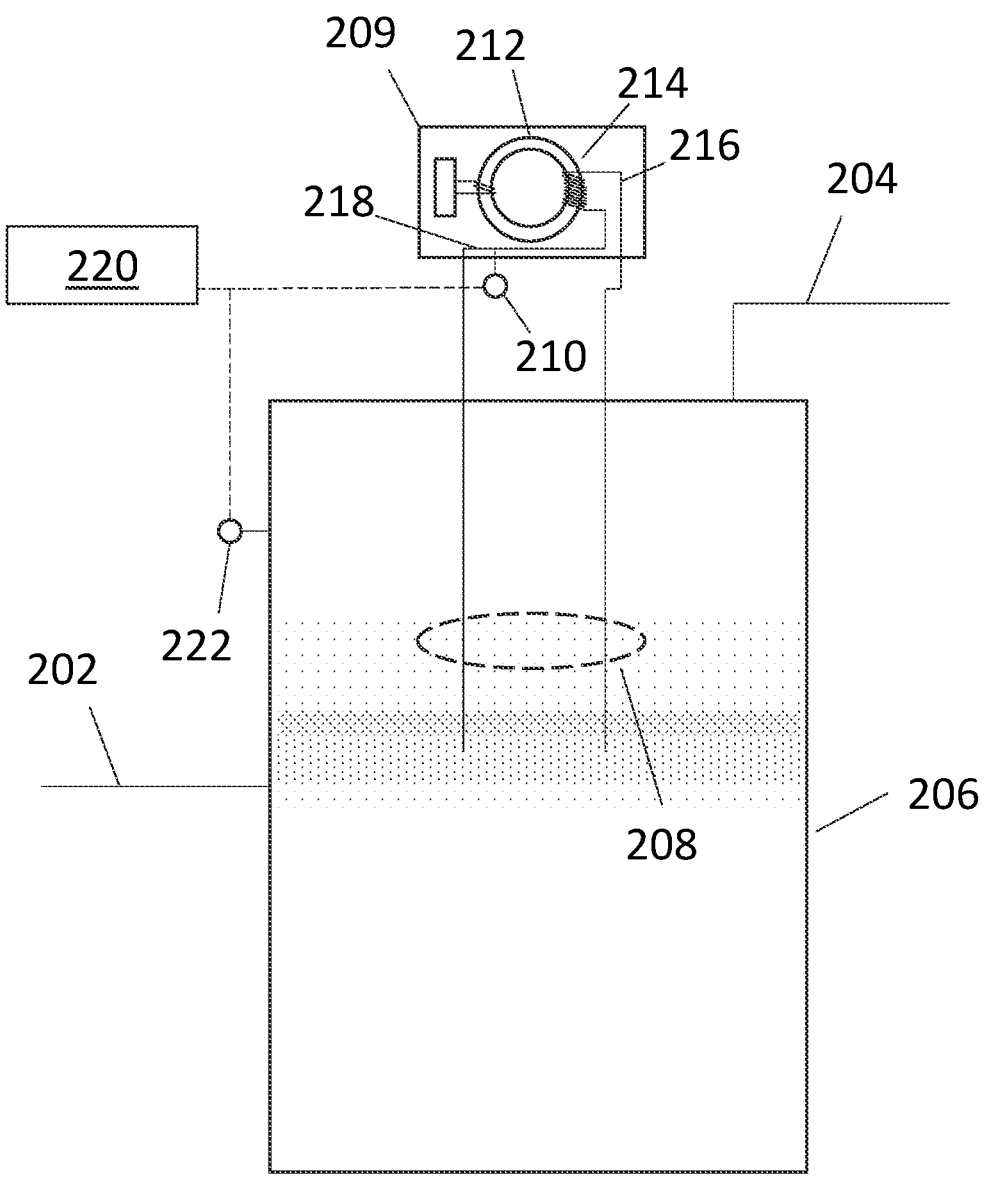
FIG. 2 is a cross-sectional view of a feed electrical analyzer according to one embodiment.

FIG. 2 is a cross-sectional view of a feed electrical analyzer 200 according to one embodiment. The feed electrical analyzer 200 has an analyzer inlet 202 and an analyzer outlet 204, both coupled to an analysis vessel 206. An electrode pair 208 is disposed in an interior of the analysis vessel 206 and is coupled to an analyzer power unit 209. In this case, the analyzer power unit 209 is an AC power unit, having a transformer 212 with secondary circuit 214 coupled to the electrode pair 208. One electrode 208 is electrically coupled to the power side 216 of the secondary circuit 214, while the other electrode 208 is electrically coupled to the return side 218 of the secondary circuit 214. Note that one of the electrodes 208 could be replaced by the vessel wall, so that one electrode 208 is disposed inside the analysis vessel 206 and the vessel 206 itself operates as the second electrode 208. The secondary circuit 214 is completed by electrical performance of the fluid between the two electrodes of the electrode pair 208. An electrical sensor 210 is coupled to the return side 218 of the secondary circuit 214. The electrical sensor 210 may be a voltage sensor, a current sensor, a phase sensor, or another type of electrical sensor that responds to changes in electrical properties in the return side 218.

The electrodes 208 in this case are just wires positioned in the interior of the analysis vessel 206. The electrodes of the electrode pair, in general, can be any conductive element, and the vessel wall of the analysis vessel 206 can serve as one electrode of the electrode pair. Electrode structures such as curved or flat plates, wires, cylinders, meshes, rods, and electrodes having irregular or other special shapes can be used. The electrodes of the electrode pair can be identical or different in shape, dimension, or composition. Specific electrode geometries can be related to fluid properties.

In operation, a multi-phase fluid mixture is admitted to the feed electrical analyzer 200, and the analyzer power unit 209 is energized. The analyzer power unit 209 will be initiated with a voltage amplitude and frequency at a first value. The electrical sensor 210 will register a value. The value can be used, along with the operating parameters of the analyzer power unit 209, to determine an electrical property of the multi-phase fluid mixture for setting operation of a separator to separate the multi-phase fluid mixture into at least two liquid phases. One or more of the voltage amplitude and frequency can be changed during determination of the electrical properties of the multi-phase mixture. A waveform can be applied to the power output of the analyzer power unit 209. A modulation can be applied to the power output of the analyzer power unit 209. A modulation can be applied to the waveform. The modulation may have its own frequency and/or waveform.

The feed electrical analyzer 200 can include an analyzer controller 220 to control operation of the analyzer power unit 209 and/or to receive signals from the electrical sensor 210. The electrical sensor 210 may include a plurality of electrical instruments, or only one electrical instrument. In any event, the analyzer controller 220 can implement an analysis procedure in which a programmed electrical stimulus is applied to a sample, and the resulting electrical readings from the electrical sensor 210 are recorded by the analyzer controller 220. The analyzer controller 220 may compute one or more characteristics of the multi-phase mixture based on the readings from the electrical sensor 210. The controller 220 may communicate with a controller of a separator, such as the controller 118, to provide analysis results, including readings from the electrical sensor 210, analyzer power unit operating parameters, and/or computed characteristics to the controller 118 so that the controller 118 can adjust operation of the separator, including but not limited to operation of the power unit 110, to optimally process the multi-phase mixture flowing toward the separator.

The feed electrical analyzer 200 may include an analyzer optical sensor 222 coupled to the analysis vessel 206. The analyzer optical sensor 222 may be an imaging device or a non-imaging optical sensor. In one embodiment, the analysis vessel 206 may have a window to admit ambient light into the vessel. The analyzer optical sensor 222 can record light transmitted through the multi-phase mixture that has been subjected to electrical stimulation. For example, the analyzer optical sensor 222 can record turbidity at a location expected to have reduced phase diversity as an indicator of separation effectiveness. Ambient brightness can be sensed and compared to transmitted brightness to define a turbidity. Alternately, a light source can be coupled with the optical sensor 222 to measure light absorption and scattering. More than one optical sensor can be used in some cases. For example, a feed optical sensor can also be coupled to the analyzer inlet 202 to register optical properties of the multi-phase mixture prior to electrical stimulation. Optical conditions registered by the feed optical sensor can be compared to optical conditions registered by the analyzer optical sensor 222 to define a turbidity reduction, or a light scattering reduction, that can be related to separation effectiveness. In other cases, the optical sensor 222 can be a video recorder that can be used to visually evaluate the result of applying electrical stimulus to the feed electrical analyzer 200. In another embodiment, the optical sensor 222 may be a Mie sensor to detect particle size and density, thus enabling direct computation of volume fraction of a dispersed liquid phase within a continuous liquid phase.

Figure 3:
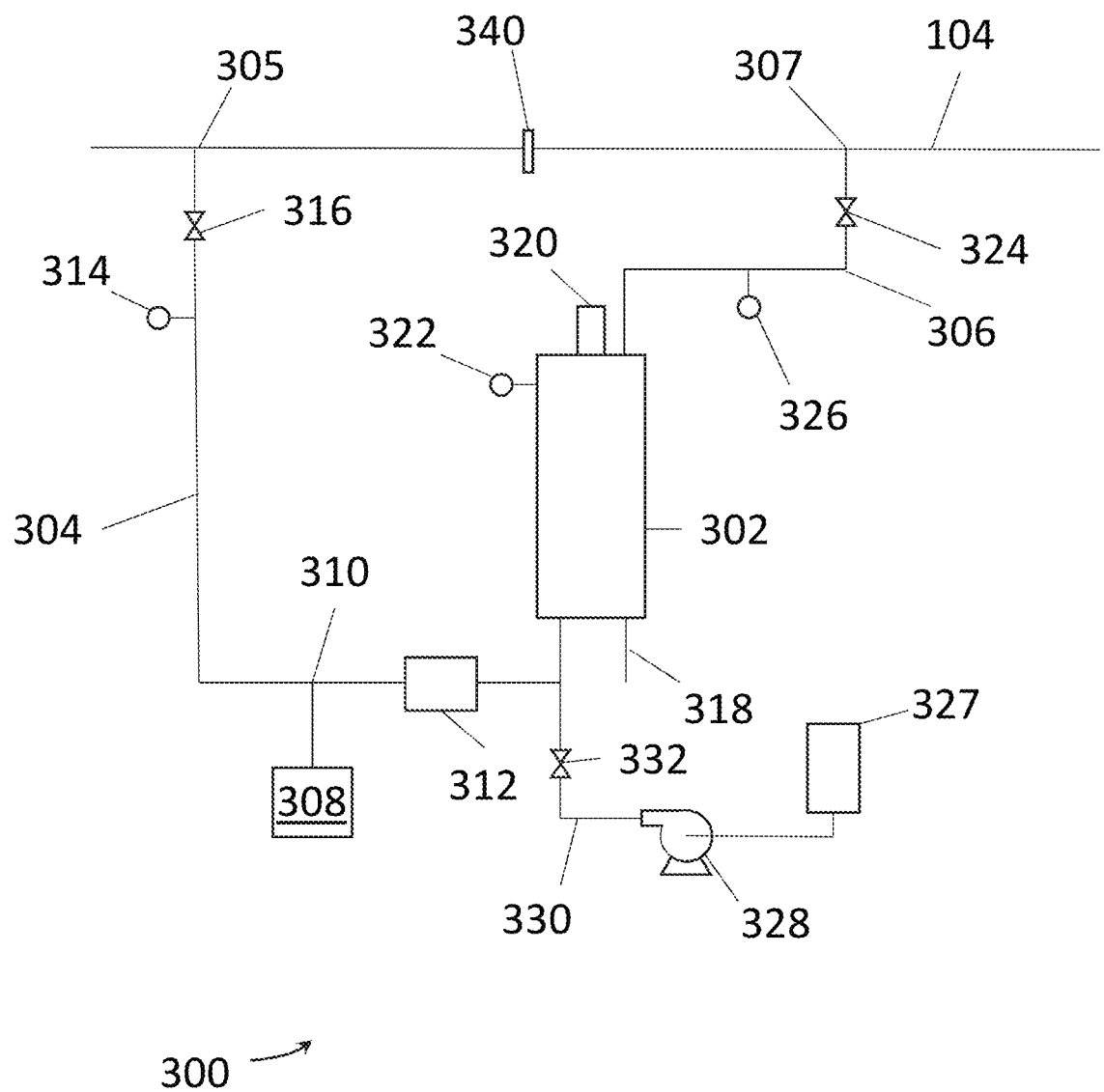
FIG. 3 is a side view of a feed electrical analyzer according to another embodiment.

In some cases, the feed electrical analyzer may be a miniature separator having an analyzer inlet and an analyzer outlet. FIG. 3 is a side view of a feed electrical analyzer 300 according to another embodiment. Here an analysis vessel 302 has an analyzer inlet 304 and an analyzer outlet 306, both coupled to the separator inlet 104. The analyzer inlet 304 is coupled to the separator inlet 104 at an inlet location 305 and the analyzer outlet 306 is coupled to the separator inlet 104 at an outlet location 307. In this case, a source of chemical separation aid 308 is coupled to the analyzer inlet 304 at a separation aid location 310. A mixer 312, for example a static or powered mixer, is coupled into the flow path of the analyzer inlet 304 between the separation aid location 310 and the analysis vessel 302. An inlet composition sensor 314 is also coupled to the analyzer inlet 304 at a location in the flow path thereof between the separator inlet 104 and the separation aid location 310 to resolve a measure of composition of the multi-phase fluid flowing through the analyzer inlet 304 before addition of separation aids. An inlet valve 316, which may be an isolation valve or a control valve, is coupled into the analyzer inlet 304 to control flow of multi-phase fluid to the analysis vessel 302. Here, the inlet valve 316 is coupled into the flow path of the analyzer inlet 304 between the separator inlet 104 and the inlet composition sensor 314. The inlet valve 316 can alternately be coupled into the analyzer inlet 304 flow path between the inlet composition sensor 314 and the separation aid location 310, or between the separation aid location 310 and the analysis vessel 302. An outlet valve 324, which may be an isolation valve or a control valve, is coupled into the analyzer outlet 306 to control return flow from the analysis vessel 302 to the separator inlet 104.

The analysis vessel 302, in this case, performs at least a partial separation of phases to produce two outlet streams. The lower density material exits through the analyzer outlet 306 and is returned to the separator inlet 104. The higher density material exits through an optional second outlet 318, which may be returned to the separator inlet 104 or routed to other destinations. A power unit 320 is coupled to the analysis vessel 302 to apply power to the fluids in the vessel. An optical analyzer 322 is coupled to the analysis vessel 302 to provide optical data. In this case, the feed electrical analyzer 300 is configured to provide data about quality of the less dense material exiting through the analyzer outlet 306, so the optical analyzer 322 is coupled to the analysis vessel 302 at an upper part of the vessel to provide optical analysis data of the fluid that enters the analyzer outlet 306 from the analysis vessel 302.

An outlet composition sensor 326 is coupled to the analyzer outlet 306. The outlet composition sensor 326 may be in the analyzer outlet 306 flow path between the analysis vessel 302 and the outlet valve 324 or between the outlet valve 324 and the separator inlet 104. The sensors 314, 322, and 326 provide information about the separation performance of the analyzer 300 that can be used in a feedforward control scheme for the separator 100. The power unit 320 can also provide information such as changing loads and conditions to the analyzer 300.

The analyzer 300 is configured to operate in continuous flow mode, semi-continuous flow mode, semi-batch flow mode, or batch mode. In continuous flow operation, the inlet and outlet valves 316 and 324 are open so that a portion of the multi-phase fluid flowing through the separator inlet 104 is received into the analyzer inlet 304, routed through the analysis vessel 302, and returned to the separator inlet 104 through the analyzer outlet 306 continuously. The power unit 320 applies power to the fluid flowing through the analysis vessel 302 to cause enhanced separation in the vessel, and a separated, or partially separated, stream is withdrawn through the analyzer outlet 306. The sensors 314, 322, and 326 measure inlet composition, optical condition, and outlet composition while fluid flows through the vessel 302. In continuous flow mode, the flowrate of fluid through the electrical analyzer can be adjusted to simulate the flowrate through the separator, for example based on the difference in size between the analyzer and the separator. Such adjustments may improve the relationship between results predicted by the analyzer and results obtained in the separator.

In semi-continuous flow mode, flow of fluids through the analysis vessel 302 is occasionally stopped by closing one or both the inlet and outlet valves 316 and 324. During flow stoppage, application of power from the power unit 320 may be continued or discontinued, and transmission of readings from the sensors 314, 322, and 326 may be continued or discontinued. In semi-continuous flow operation, duration of stoppages is typically much shorter than duration of continuous flow periods.

In semi-batch and batch mode, power is typically applied by the power unit 320, and readings taken by the sensors 314 and 326, while flow through the vessel 302 is stopped. In semi-batch mode, power is applied, and some readings taken, while fluids flow through the vessel 302, while in batch mode, no power is applied, or readings taken, during flow periods. In all the flow modes described above, the analyzer outlet 306 could be routed to any suitable disposition and does not have to be returned to the separator inlet 104.

The capabilities of the analyzer 300 allow for more discriminating analysis of separation performance and effect of parameters and patterns on separation performance. Analyzing performance in continuous flow mode provides quick and frequent data on changes in performance, while analyzing performance using batch mode analysis provides more residence time to observe separation in the analyzer 300 and to produce more data about the effects of separation parameters on such performance.

To facilitate batch mode analysis, a fluid source 327 is coupled to the analysis vessel 302 by a pump 328 to displace fluids processed in the vessel 302 in batch mode. The pump 328 is fluidly coupled to the analysis vessel 302 by a displacement line 330, which in this case is joined to the analyzer inlet 304 but may alternately be coupled directly to the analysis vessel 302. A valve 332 can be used to isolate the pump 328 and fluid source 327 from the analysis vessel 302, if desired.

When the separator 100, with feed analyzer 300, is used to separate crude oil from produced water, the fluid source 327 can provide a clean oil to displace the separated hydrocarbon portion from the analysis vessel 302 to be probed by the composition sensor 326 and returned to the separator inlet 104. When the next batch is captured for separation in the analysis vessel 302, the pump 328 can be isolated from the vessel 302, and analyzer inlet and outlet valves 316 and 324 can be opened, and the displacement fluid in the vessel 302 can be displaced into the separator inlet 104. After flowing fluids from the separator inlet 104 through the analysis vessel 302 and back into the separator inlet 104 for a period to flush the vessel 302, the valves 316 and 324 can be closed to capture a sample in the vessel 302 for separation using the power unit 320. A pressure drop member 340 is provided in the separator inlet 104 between the inlet location 305 and the outlet location 307 to ensure flow through the feed electrical analyzer 300 when the valves 316 and 324 are open. The clean oil can also be used to calibrate the analyzer 300 or detect and control bias drift of the analyzer 300.

It should be noted that flow of separation aid from the separation aid source 308 is controlled, using a control valve (not shown) for example, to provide control over the amount of separation aid used for the analyzer 300. To provide such control, flow rate of the multi-phase fluid flowing through the analyzer inlet 304 must be ascertained. A multi-phase flow meter (not shown), of any type known in the industry, can be used to sense flow rate.

In general, a fluid electrical analyzer can be configured with different geometry and different electrical drive properties to focus on different electrical properties and different ranges. For example, where conductivity is the distinguishing property of interest, two electrodes can be positioned a set distance apart and driven by a selectable voltage or voltage pattern to resolve conductivity differences sensitive to composition changes. The distance is selected to maximize resolution of the composition differences in a calibration range of interest. The electrodes may be enclosed in a non-conductive conduit into which a sample can be introduced or through which a sample stream may be flowed. In another example, where permittivity is the distinguishing property of interest, two electrodes with selected area can be positioned a set distance apart and driven by a selectable voltage or voltage pattern to resolve capacitance differences sensitive to composition changes. Different types of electrical analyzers can be used for different electrical properties and different ranges to control separation of fluid mixtures based on electrical properties of the components of the mixture.

Figure 4:
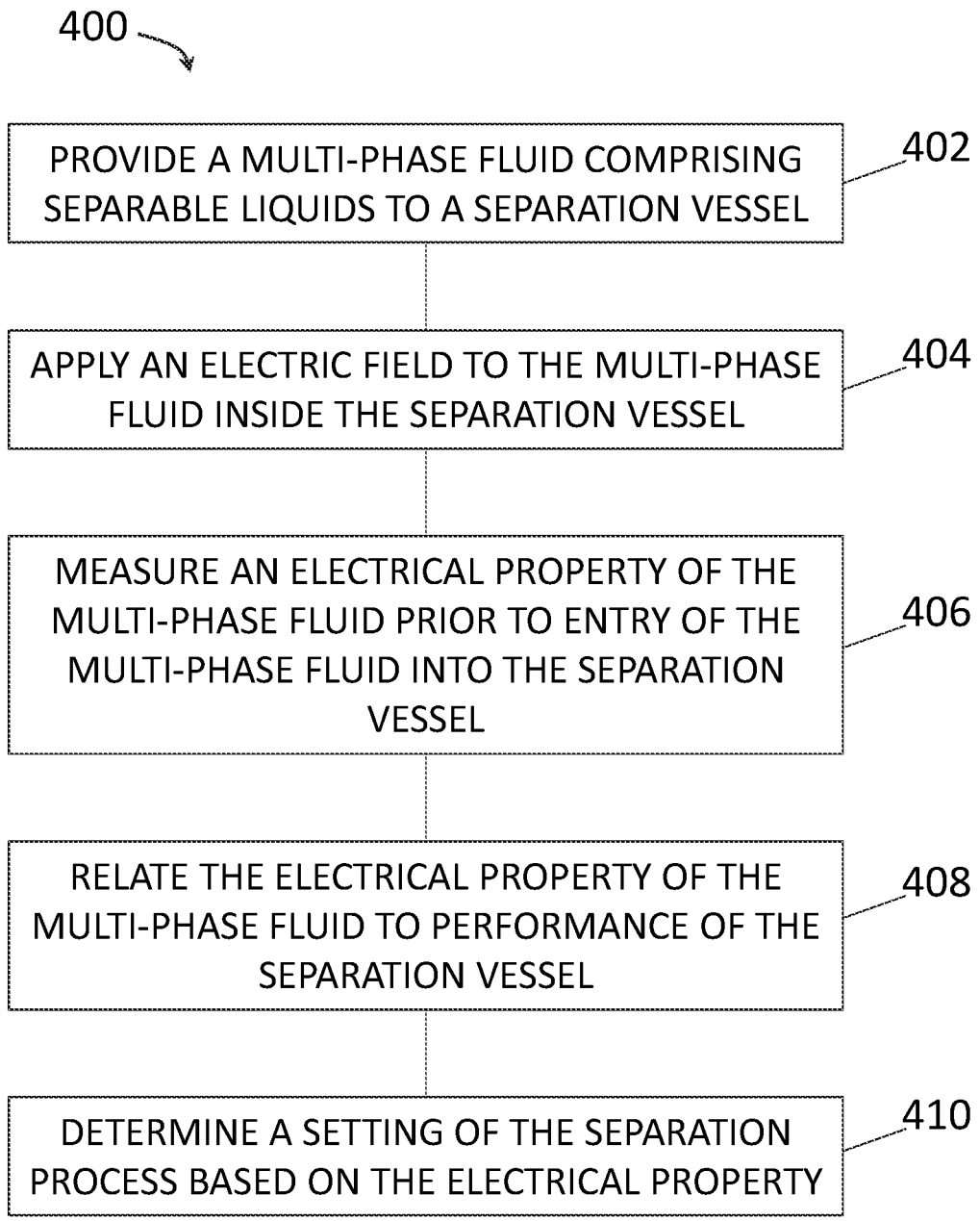
FIG. 4 is a flow diagram summarizing a method according to one embodiment.

FIG. 4 is a flow diagram summarizing a method 400 according to one embodiment. The method 400 is a method of controlling a separation operation for separating multi-phase fluids using electric fields to enhance the speed of separation. At 402, a multi-phase fluid comprising separable liquids is provided to a separation vessel. At 404, an electric field is applied to the multi-phase fluid inside the separation vessel to enhance separation of the separable liquids in the multi-phase fluid. The liquids separate into at least two phases, so that a first liquid is withdrawn from a first outlet of the separation vessel and a second liquid is withdrawn from a second outlet of the separation vessel. The first liquid has a composition that is predominantly made up of one of the separable liquids, and the second liquid has a composition that is predominantly made up of another of the separable liquids, the first and second liquids having been separated by operation of a physical property such as density or molecular affinity accelerated by application of the electric field.

At 406, an electrical property of the multi-phase fluid is measured prior to entry of the multi-phase fluid into the separation vessel. An electric field is applied to a portion of the multi-phase fluid to cause a change to the fluid, and the electrical property is measured in a portion of the fluid chosen to be predictive of separation performance of the separation vessel in separating the first and second liquids. In one embodiment, the electrical property of the multi-phase fluid is measured in an upper region or volume of the fluid to detect electrical properties of the portion of the multi-phase fluid tending to move to the upper region or volume. For oil/water separations, this results in detecting electrical properties of a fluid that is predominantly oil.

The portion of the multi-phase fluid is routed to an analysis vessel, and the electric field is applied to the multi-phase fluid in the analysis vessel. At least one electrode is disposed in the analysis vessel for application of the electric field to the portion of the multi-phase fluid. A power unit couples power to the electrode, and a circuit return path is provided from the analysis vessel to the power unit. The return path may utilize the wall of the analysis vessel as a second electrode, or a second electrode may be disposed in the analysis vessel. The multi-phase fluid between the electrodes absorbs power from the electric field, resulting in an electric circuit from the power unit to the analysis vessel. The electrical property of the multi-phase fluid is sensed at a location selected to be predictive of separation performance of the separation vessel. A sensor may be coupled to the return path of the analysis vessel to sense electrical conditions in the return path. Alternately, a third electrode may be disposed in the analysis vessel at a location selected to sample electrical properties of a portion of the multi-phase fluid, and a sensor may be coupled to the third electrode. The sensors typically sense current or voltage. In some cases, the sensor can sense phase where AC power is used, and the phase resolved by the sensor can be compared to the phase of the applied power to detect a phase shift. The phase shift can indicate power consumption by the multi-phase fluid.

In some cases, electrical properties may be sensed at more than one location. For example, if the vessel wall is used as circuit return path for the power unit, and an additional electrode is exposed to the multi-phase fluid in the analysis vessel, the two electrical properties sensed at different locations may be used to indicate separation activity in the analysis vessel.

At 408, the electrical property sensed at 406 is related to performance of the separation vessel. This can be done using statistical or physical models. The models can be initialized and updated using performance data of the separation process and measurement data of the analyzer. In one operating method, the analyzer is operated using a constant power from the power unit, and changes in electrical properties sensed by the sensor (or sensors) indicate changing composition of the multi-phase fluid, which can be related to separation performance by the separator. In another operating method, power unit conditions such as frequency, amplitude, and waveform can be adjusted to control the sensed electrical property, and the power unit conditions can indicate changing composition of the multi-phase fluid, which can be related to separation performance by the separator.

At 410, at least one setting of the separation process is determined and adjusted based on the sensed electrical property. A controller is typically used to apply the relationship between data obtained from the analyzer used to sense the electrical property and separation performance to obtain one or more settings to adjust. The controller may apply a model to a data set comprising data obtained from the separator and data obtained from the analyzer to resolve settings that need adjusting. The data set may include temperature, pressure, composition, multi-phase fluid flow rate, flow rate of separation aids, and power unit conditions for the separator and for the analyzer, as applicable, along with electrical properties sensed by the analyzer. A statistical, physical, or AI model (such as neural network or principal component model), or any combination thereof, can be used to resolve settings that might need adjusting. Filters or thresholds may be applied to the resolved settings so that de minim is changes are ignored.

In one case, the multi-phase fluid is flowed through the analyzer while the analyzer power unit is operated to apply power to the flowing fluid and while sensors sense the electrical property. The temperature, pressure, multi-phase fluid flow rate, power unit conditions, and one or more electrical properties, which can be voltage, current, and/or phase, are provided to a controller for determining separator settings. In another case, a volume of multi-phase fluid is captured in the analyzer, power is applied to the captured volume, and the one or more electrical properties are sensed. In this case, temperature, pressure, power unit conditions, and sensed electrical properties can be provided to the controller. In either case, power unit conditions may be held constant or optimized to hold the one or more electrical properties constant. The analyzer may also have an optical sensor to provide optical information about the multi-phase fluid in the analyzer. The optical information can be provided to the controller as additional data to improve resolution of separator setting changes.

Figure 5:
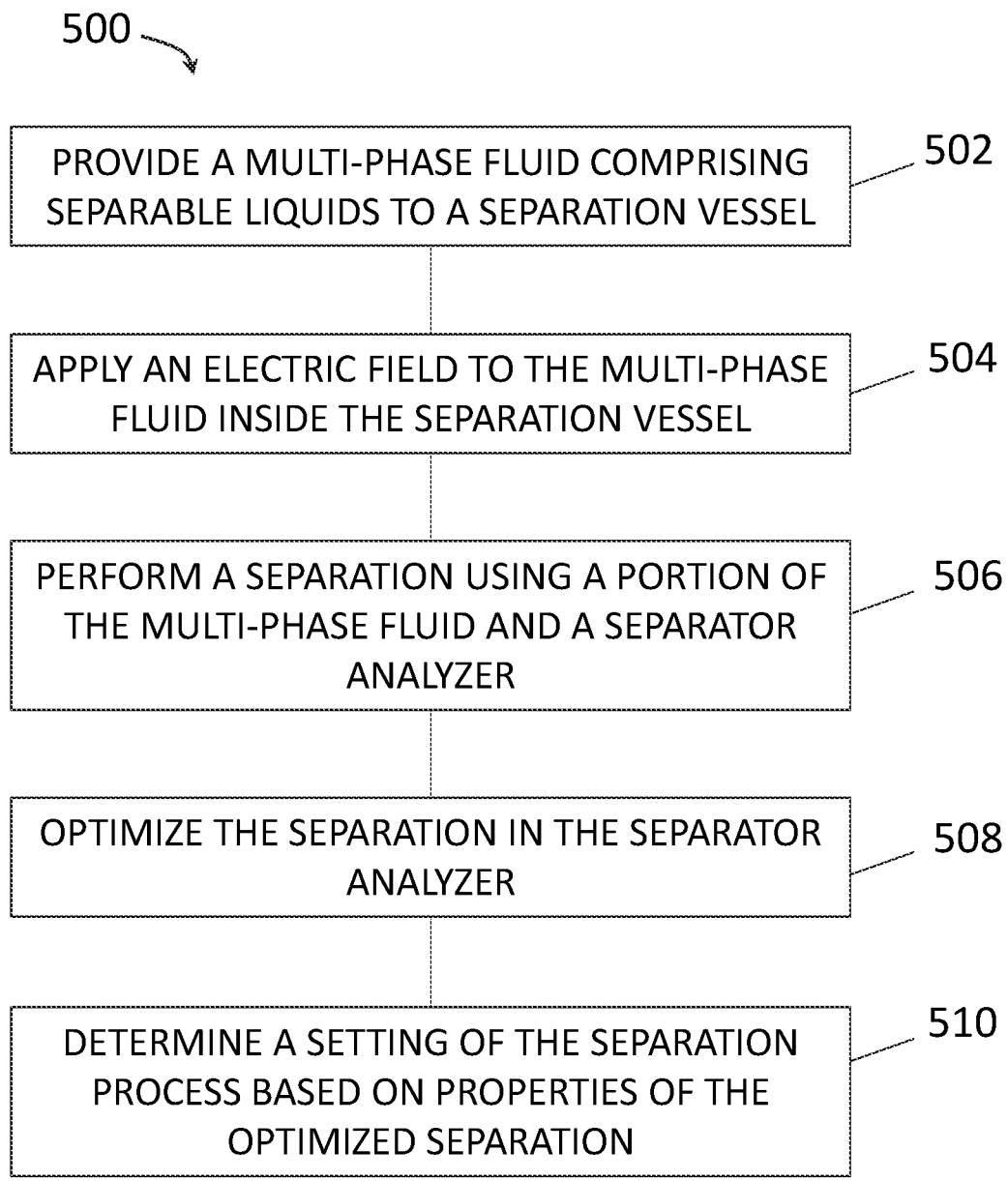
FIG. 5 is a flow diagram summarizing a method according to another embodiment.

FIG. 5 is a flow diagram summarizing a method 500 according to another embodiment. The method 500 is similar to the method 400, except that the method 500 uses a separator analyzer that performs a separation using a portion of the multi-phase fluid at 506. The separation performed in the analyzer is typically adapted to represent the separation being performed in the main separator. Thus, separation aids are typically added to the analyzer, as with the main separator. The separation analyzer produces two streams, both of which may be sensed to provide composition, temperature, pressure, and flow rate information about the separation. At 508, operation of the separation analyzer is optimized to provide power unit settings representing an optimal, or near-optimal, separation performance. The power unit settings, along with temperature, pressure, composition, and optionally electrical property and optical data, can be provided to a controller to determine settings, at 510, of the separation process that can be adjusted to optimize the main separation process. As above, the controller can use statistical, physical, and AI models, in any useful combination, to determine settings that can be adjusted. As with the analyzer described in connection with the method 400, the separation analyzer used here can be operated by continuously flowing a portion of the multi-phase fluid through the analyzer and observing the separation performance, or by capturing a volume of the multi-phase fluid in the separation analyzer.

In both the methods 400 and 500, where AI models are used, the AI models can be trained, in one case, using data from large-scale commercial separators with analyzers coupled thereto. Data from the analyzer is captured while the separator is operated with or without applying control to the separator based on results from the analyzer. The analyzer can also be operated in the absence of a commercial separator, and the data collected from the analyzer can be related to a commercial separator by matching conditions such as feed composition, temperature, pressure, flow rate, and ambient conditions. Separate analyzer and commercial separation data sets can be provided to the training algorithm to resolve network coefficients for operating a neural network model, for example. In another example, a model of the analyzer, statistical, physical, or AI, can be linked to a separate model of the commercial separator, which can also be statistical, physical, or AI, to yield a combined model of the system.

It should be noted that the feed electrical analyzers described herein can be used with multiple separators processing the same feed stream. Thus, for example, where three identical separators are running in parallel to process a single multi-phase stream, a single feed electrical analyzer can be coupled to the multi-phase stream, and the data from the analyzer used to adjust all three separators. Additionally, where separators are arranged in series, the electrical analyzers described herein can be coupled to the feed of each separator to enable feedforward control of each separator.

It should also be noted that orientation of a separator, horizontal, vertical, or angled, does not necessarily define flow through the separator. For example, a vessel oriented horizontally may have vertical flow, and vice versa. Orienting, and configuring flow through, an electrical analyzer to match orientation and flow through the separator being analyzed generally improves applicability of analyzer results to the separation process, but in some cases, specific geometry of an analyzer may be useful for determining certain characteristics or operating conditions regardless of configuration of the separation process.

Figure 6:
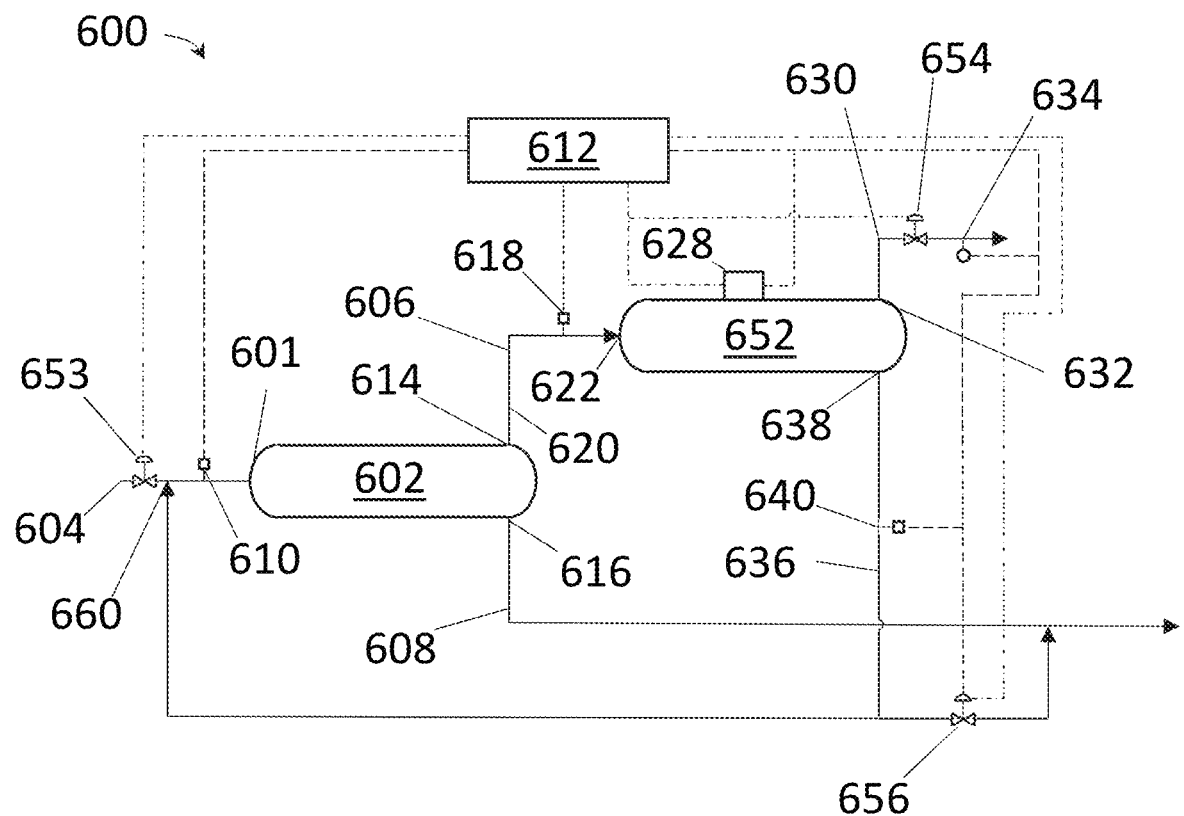
FIG. 6 is a schematic process diagram of a separation process, according to one embodiment.

FIG. 6 is an example of such a configuration. FIG. 6 is a schematic process diagram of a separation process 600, according to one embodiment. The separation process 600 uses electrical analyzers to control the process. In this example, two separators 602 and 652 are arranged in series flow to perform the separation process 600. Three electrical analyzers and one quality analyzer are used to control the process 600. These separators are shown with a horizontal flow component, but as described elsewhere herein, such separators can be configured to have no horizontal flow component. Additionally, these separators are shown with horizontal orientation, but as noted elsewhere herein, such separators can be oriented vertically, or at some angle between horizontal and vertical, and each separator may have an individual orientation different from other separators in the train.

A feed stream 604 is charged to a first separator 602 at an inlet 601 thereof. The feed stream 604 comprises fluid components having different electrical properties. The first separator 602 is a gravitational separator that separates the feed stream 604 into a first separated stream 606 and a second separated stream 608 based on density differences between fluid components of the feed stream 604. The first separated stream 606 is taken from the first separator 602 at a location selected to maximize purity of the first separated stream 606.

A first electrical analyzer 610 is coupled to the feed stream 604 to determine electrical properties of the feed stream 604, containing the mixture of separable fluids. A controller 612 is coupled to the first electrical analyzer 610 to receive signals from the first electrical analyzer 610 representing one or more electrical properties of the feed stream 604, which may be conductivity, permittivity (which may be dielectric constant), or another relevant electrical property. The first electrical analyzer 610 can be any of the electrical analyzers described herein. The first electrical analyzer 610 can input a constant electrical load into the analyzed fluid and can send signals representing voltage and/or current conditions that change with fluid properties to the controller 612. Alternately, the first electrical analyzer 610 can use local fluid sensors to optimize fluid separation in the analyzer and can send signals representing the optimal separation conditions (voltage, frequency, amplitude, modulation characteristics, etc.) to the controller 612.

The first separated fluid 606 is withdrawn from a first outlet 614 of the first separator 602. The second separated fluid 608 is withdrawn from a second outlet 616 of the first separator 602 and can be routed to any desired disposition (not shown in FIG. 6). Since the first separator 602 is a gravitational separator, no electric fields have been used to aid separation in the first separator 602. Chemical separation aids can be used, however, along with operating conditions such as temperature and pressure, to affect separation in the first separator 602. The controller 612 may adjust any or all of temperature, pressure, flow rate, and chemical separation aid addition to the first separator 602 based on the signals received from the first electrical analyzer 610.

The first separated fluid 606 is routed to a second separator 652 by a conduit 620 that connects the first outlet 614 of the first separator 602 to an inlet 622 of the second separator 652. A second electrical analyzer 618 is coupled to the first separated fluid 606 in the conduit 620 at any location between the first outlet 614 of the first separator 602 and the inlet 622 of the second separator 652. The second electrical analyzer 618 can be any of the electrical analyzers described herein, and is operatively coupled to the controller 612 to send signals representing properties of the first separated fluid 606 to the controller 612. As described elsewhere herein, the signals are electrical signals that the controller 612 is configured to interpret in order to infer properties of the first separated fluid 606.

The second electrical analyzer 618 may be the same type and configuration as the first electrical analyzer 610, or may be a different type or configuration. The first separated fluid 606 may have a composition substantially different from the composition of the feed stream 604. Different geometries may be used to optimize discrimination of electrical properties of fluids with very different compositions. For example, hydrocarbon fluids with very different water content (e.g. an order of magnitude or more) have different capacitances. One such fluid may provide a sensitive current response to electrical stimulation while another fluid may provide a sensitive phase angle response, depending on the characteristics of the two fluids. Known machine learning techniques can be used to define, and dynamically adjust, optimal stimuli and response variables for monitoring desired properties of the two fluids.

The first separated fluid 606 and the second separated fluid 608 have different bulk densities and electrical properties. In many cases, the second separated fluid 608 has higher density and electrical conductivity than the first separated fluid 606, for example when the second separated fluid 608 is predominantly aqueous and the first separated fluid 606 is predominantly hydrocarbon. An electrical analyzer configured to respond to fluid properties of fluids generally having properties like those expected of the second separated fluid 608, for example electrical analyzers configured and calibrated for aqueous service, can be coupled to the second separated fluid 608 if desired, but is not shown in FIG. 6.

The second separator 652 has a power unit 628 that couples electric power into the fluid inside the second separator 652. The power unit 628 forms an electric field, which may be static or time-varying, inside the second separator 652 to aid separation of the fluids therein. A third separated fluid 630 is withdrawn from a first outlet 632 of the second separator 652. A quality analyzer 634 is coupled to the third separated fluid 630, and may be any of the quality analyzers described herein. A fourth separated fluid 636 is withdrawn from a second outlet 638 of the second separator 652. A third electrical analyzer 640 is coupled to the fourth separated fluid 636. The quality analyzer 634 and the third electrical analyzer 640 are operatively coupled to the controller 612 to provide signals representing properties of the third and fourth separated fluids 630 and 636, respectively, to the controller 612.

Flowrate of the feed stream 604 is controlled by a first control valve 653. Flowrate of the third separated fluid 630 is controlled by a second control valve 654. A portion of the fourth separated fluid 636 is routed to a disposition not shown in FIG. 6. Here, the disposed portion of the fourth separated fluid 636 is mixed with the second separated fluid 608. Flowrate of the routed portion of the fourth separated fluid 636 is controlled by a third control valve 656. The first, second, and third control valves 653, 654, and 656 are operatively coupled to the controller 612 to receive control signals from the controller 612. The controller 612 determines control signals for one or more of the first, second, and third control valves 653, 654, and 656 based on the signals received from the analyzers 610, 618, 634, and 640.

A portion of the fourth separated fluid 636 may be recycled to the first separator 602. Flowrate of the recycled portion is controlled by back-pressure from the third control valve 656. Thus, in this case the controller 612 is configured to control recycle of a portion of the fourth separated fluid 636 using back-pressure from the third control valve 656. The recycled portion may be mixed with the feed stream 604 at a mixing point 660, as shown in FIG. 6, or routed directly to the first separator 602 through a dedicated inlet. Here, the first electrical analyzer 610 is located between the mixing point 660 and the inlet 601 to provide signals representing electrical properties of the mixed fluid flowing to the first separator 602. Alternately, the first electrical analyzer 610 can be located upstream of the mixing point 660, with the mixing point 660 located between the first electrical analyzer 610 and the inlet 601, to provide signals representing fluid properties of only the feed stream 604. In such cases, the signals from the first and third electrical analyzers 610 and 640, along with flowrates of the first and third control valves 653 and 656, can be used by the controller 612 to infer properties of the fluid entering the first separator 602.

The separation process 600 is shown to illustrate use of electrical analyzers and quality analyzers at different locations in a separation train for fluid separation where multiple separators, potentially of different types, are used to separate a feed stream comprising separable fluids having different densities and electrical properties into multiple separated streams. Quality analyzers are optional here, and may be used in any combination with electrical analyzers as may be beneficial for particular processes. The controller 612 here is configured to receive the signals from the analyzers and send control signals to the control valves. Based on the signals, the controller 612 is configured to infer fluid properties of the feed stream and separated streams, to determine new control signals to improve operation of the separation process 600, and to send those new signals to the control valves. Sensors can also be provided throughout the separation process 600 to sense temperature and pressure, and to send signals representing the temperatures and pressures to the controller 612, which in turn can be configured to use the temperature, pressure, electrical analyzer, and control valve signals to improve operation of the separation process 600. Thermal adjusters (e.g. heaters and/or coolers) can be provided throughout the separation process 600 to add or withdraw heat as needed, controlled by signals sent from the controller 612, to optimize the separation process 600. Chemical separation aids can also be provided throughout the separation process 600, with flowrates thereof controlled by signals from the controller 612, to optimize performance of the separation process 600.

It should be noted that more or fewer electrical analyzers and quality analyzers can be used than are shown in FIG. 6, and more or fewer control valves can be used than are shown in FIG. 6. The embodiment of FIG. 6 merely illustrated the general concept of using electrical analyzers at various locations in a fluids separation process, optionally in combination with quality analyzers. A single electrical analyzer can also be used to analyze and provide signals representing the properties of multiple streams. For example, one electrical analyzer could be used to monitor all of the streams 604, 606, and 636, with appropriate piping and control valves, controlled by the controller 612, to provide samples of one stream at a time to the electrical analyzer. An electrical analyzer can thus be coupled to any combination of the feed stream 604, the first separated stream 606, and the fourth separated stream 636, in the embodiment of FIG. 6, and generally to more than one stream in a given process, and can be used to provide signal representing properties of all such stream to the controller. In the other embodiments described herein, one electrical analyzer can be coupled to more than one sample source by appropriate piping and control means. For example, whereas the embodiment of FIG. 6 is a multiple-vessel separation train, in the other embodiments described herein where a separation is performed by a single separation vessel, multiple such single-vessel separation trains can be coupled to a single electrical analyzer by appropriate piping and control means to provide analysis of the separation processes. Multiple multi-vessel separation trains can also be coupled to a single electrical analyzer. The same can be said where different types of electrical analyzers may be deployed at different locations in a separation train. Where multiple such separation processes are used, each of the different types of electrical analyzers can be coupled to more than one separation process for a many-to-many coupling of electrical analyzers to separators.

Figure 7:
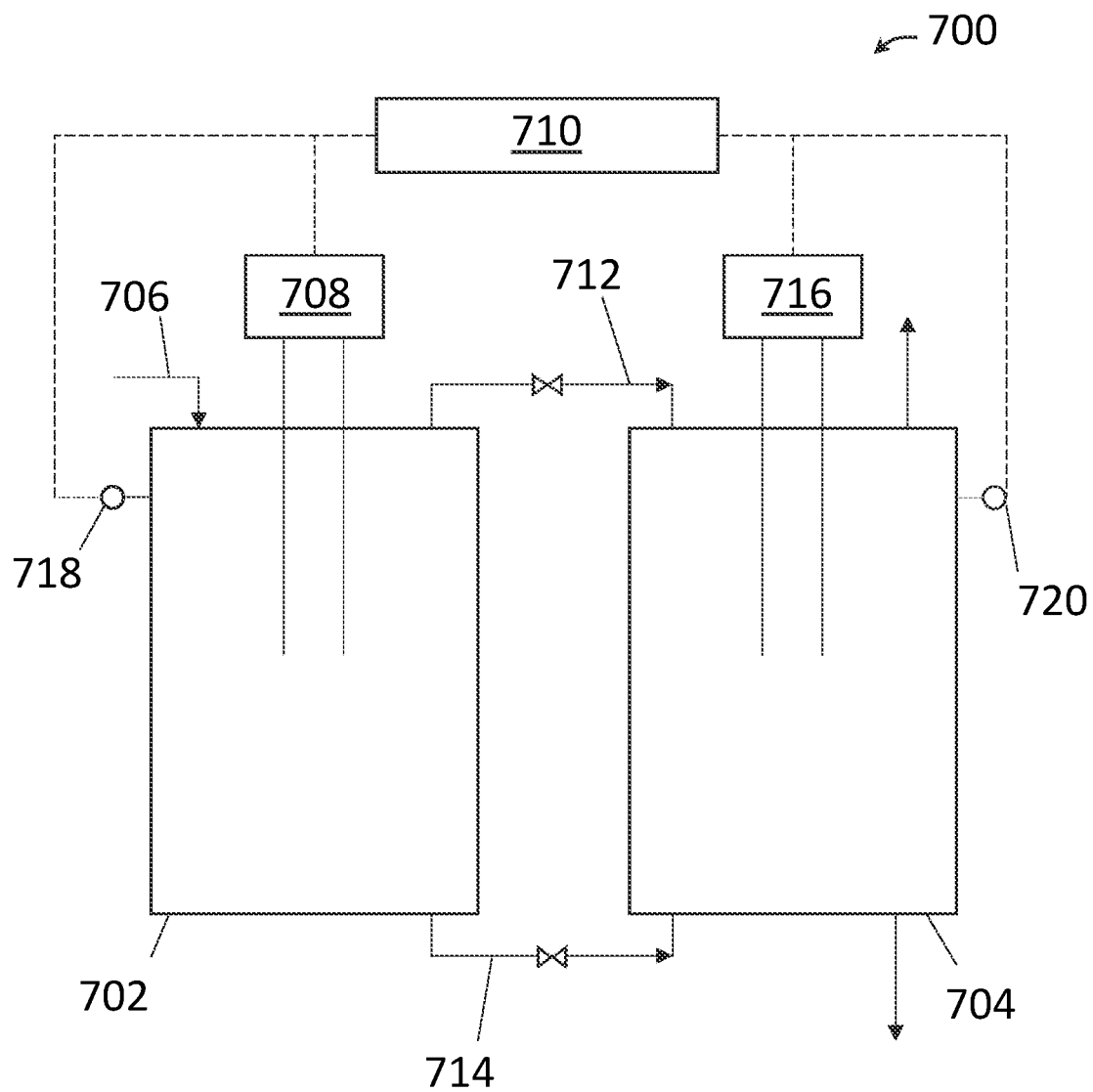
FIG. 7 is a schematic side view of a series electrical analyzer according to one embodiment.

FIG. 7 is a schematic side view of a series electrical analyzer 700 according to one embodiment. The series analyzer 700 comprises a first electrical analyzer 702 and a second electrical analyzer 704 arranged in series flow, allowing the serial analyzer 700 to simulate a series separation process such as the process 600. A feed to the series analyzer 700 is provided to the first analyzer 702 through a feed line 706 and a first separation or partial separation is performed in the first analyzer 702 by providing power to a first power unit 708 of the first analyzer 702. A controller 710 is operatively coupled to the first power unit 708, and controls the first power unit 708 to apply power to the fluid in the first analyzer 702.

The series analyzer 700 is configurable in operation. A first outlet 712 at an upper part of the first analyzer 702 can be used to transfer material from the first analyzer 702 to the second analyzer 704. Alternately, or additionally, a second outlet 714 at a lower part of the first analyzer 702 can be used to transfer material from the first analyzer 702 to the second analyzer 704. The first outlet 712 is configured to transfer material to an upper part of the second analyzer 704, while the second outlet 714 is configured to transfer material to a lower part of the second analyzer 704. Using the two outlets 712 and 714, material can be transferred from the first analyzer 702 to the second analyzer 704 using either or both of an upper pathway and a lower pathway. Thus, a separation or partial separation can be performed in the first analyzer 702, and one or both separated phases can be transferred to the second analyzer 704 using the outlets 712 and 714. Valves of any convenient variety can be used with the outlets 712 and 714 to control how those outlets are used to transfer material from the first analyzer 702 to the second analyzer 704.

The second analyzer 704 performs a second separation or partial separation of material transferred from the first analyzer 702 by either or both of the outlets 712 and 714 by applying power from a second power unit 716 to the fluid in the second analyzer 704. The controller 710 is operatively coupled to the second power unit 716 to control the application of power. Outlets can be provided in convenient locations to remove material from the second analyzer 704 when analysis of the material therein is complete.

The series analyzer 700 can use one or more sensors coupled to the first analyzer 702, the second analyzer 704, or both, to simulate a series separation. Use of sensors, operatively coupled to the controller 710, allows determination of the effect of changing operating conditions on parameters of the series separation performed in the series analyzer 700. Such information can be used to control a production unit that performs a series separation, such as the process 600. In FIG. 7, a first sensor 718, which may be a first sensor group, is coupled to the first analyzer 702, and a second sensor 720, which may be a second sensor group, is coupled to the second analyzer 704. Each of the sensors 718 and 720 may be any or all of temperature, pressure, composition, electrical, and optical sensors, for example like the sensor 222. Electrical sensors may be conductivity or capacitance sensors. Composition sensors of any known type convenient for the process may be used.

Figure 8:
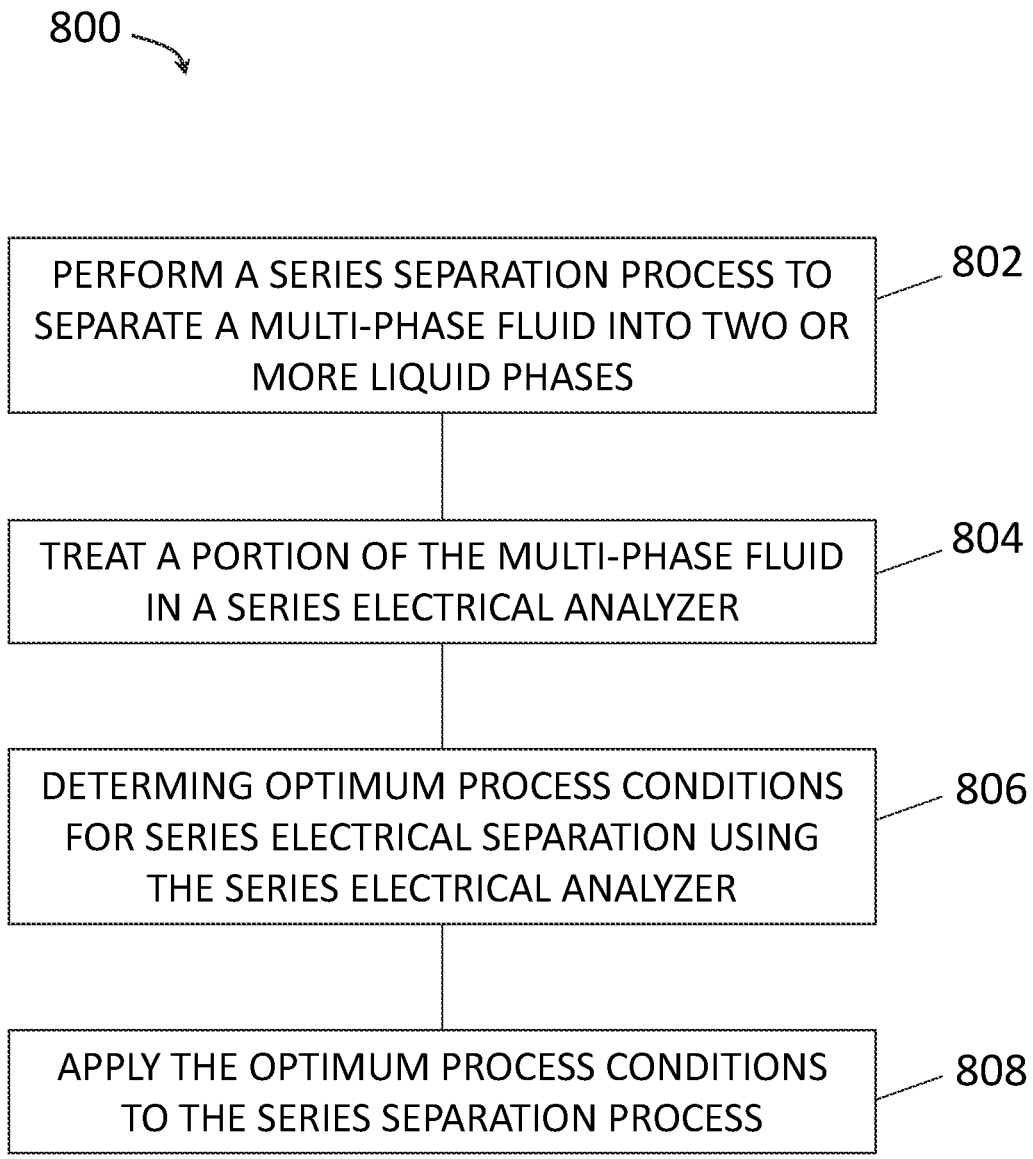
FIG. 8 is a flow diagram summarizing a method according to another embodiment.

The series analyzer 700 may be coupled to a series separation process like the process 600 on a feed side thereof to provide feedforward control capability for the series separation process. Such configuration provides opportunity to practice sophisticated control methods. FIG. 8 is a flow diagram summarizing a method 800 according to another embodiment. The method 800 can be practiced, for example, on the process 600 configured with the series analyzer 700.

At 802, a series separation process is performed to separate a multi-phase fluid into two or more liquid phases. A series separation process like the process 600 is an example. Multiple separation vessels are arranged for series flow. One, more than one, or all vessels may have an electric field unit to create an electric field within the vessel to aid separation of fluids in the vessel. A series electrical analyzer, such as the analyzer 700, can be used to define optimum, or near-optimal, process conditions for the series separation process.

At 804, a portion of the multi-phase fluid is treated in a series electrical analyzer. The electrical analyzer is operated to perform a separation similar to the separation intended to be accomplished in the separation process. It may be, in some cases, that the separation performed by the electrical analyzer is not the same as that being performed in the separation process, but the electrical analyzer is, in any case, used to gain information about optimal series processing of the multi-phase fluid.

At 806, the series electrical analyzer is used to determine optimum process conditions for series electrical separation of the multi-phase fluid using the series electrical analyzer. One way to do this is to operate the series electrical analyzer to separate the multi-phase fluid according to targets applied to the series separation process. If the series electrical analyzer can meet the targets, the conditions adopted in the series electrical analyzer can be considered potentially optimal for the series separation process. Another way is to perform a separation of the multi-phase fluid, using the series electrical analyzer, that does not conform to the targets of the series separation process, but that nonetheless yields information that can be used to find potentially optimal process conditions for the series separation process. Information about the conditions used in the analyzer, and the results obtained, can be provided to a model that can be used to compute potentially optimal conditions for the series separation process.

At 808, the optimum process conditions determined using the analyzer are applied to the series separation process. In one aspect, the series separation process can include sensors, and readings from the sensors can be compared with results obtained by the series electrical analyzer to determine the effect of the process conditions applied to the series separation process. Differences between expected results and actual results can be applied to any models used to translate results from the analyzer to process conditions applied to the series separation process. In another aspect, where such adjustments are made, operation of the series electrical analyzer can be adjusted using such models. Where the series electrical analyzer and the series separation process are operated as part of a continuous or semi-continuous control loop, a controller configured to control and analyze operation of the analyzer and the process can also be configured to seek goals among various conditions and characteristics of the process and the analyzer using models that simulate the series separation process, the series electrical analyzer, or both.

This disclosure describes electrical analyzers as generally being coupled to inlet conduits and outlet conduits of separation vessels. In other cases, an electrical analyzer can be coupled directly to a separation vessel, either by a conduit routing material away from the vessel to the analyzer or by extending a probe of the analyzer into the vessel interior to encounter fluids inside the vessel. Thus, an electrical analyzer, for analyzing electromagnetic properties of a material, can be coupled to a separation vessel at a location other than the inlet or the outlet. Electrical analyzers can be used at any or all of an inlet, a feed location, an outlet, an effluent location, and/or the separation vessel in a mid-process location.

It should be noted that electrical analyzers, in single and/or series format, can be used in multiple instances or locations of a single separation process. For example, electrical analyzers can be used upstream and downstream of chemical additive locations to predict the effect of the additive on the separation process. The upstream analyzer may determine a first set of best conditions, and the downstream analyzer may determine a second set of best conditions different from the first set. The differences can be used to adjust flow rate and/or composition of the additive. Finally, it should be noted that electrical analyzers can be used with any fluid separation process, not merely those predicated on density differences. For example, liquid-liquid separation processes (i.e. stripping and/or extraction processes) can be monitored using electrical analyzers appropriately configured and calibrated for the electrical properties of the fluids involved.

The embodiments described herein, and other application of the concepts embodied therein, generally improve control of electrical separation units. The improved control can result in reduced energy consumption by electrical separation units, reduced use of chemical separation aids, and improved quality of water effluent from electrical separation units. The improved control can also result in the capability to use smaller vessels to perform electrical separation. All of the above benefits can result in reduced environmental footprint of electrical separation units and improved sustainability of electrical separation processes.

While the foregoing is directed to embodiments of the present invention, other and further embodiments of the present disclosure may be devised without departing from the basic scope thereof, and the scope thereof is determined by the claims that follow.

What is claimed is:

1. A separator for separating a multi-phase mixture into different liquid phases, the separator comprising:
    a separator vessel comprising:
        a separator inlet configured to receive the multi-phase mixture;
        a first separator outlet configured to output a first liquid phase of the multi-phase mixture, the first liquid phase including an aqueous fluid;
        a second separator outlet configured to output a second liquid phase of the multi-phase mixture, the second liquid phase including a hydrocarbon fluid; and
        a first power unit electrically connected to one or more electrodes within the separator vessel, the first power unit configured to create an electric field in the separator vessel to separate the multi-phase mixture in the separator into the first liquid phase and the second liquid phase;
    an electrical analyzer, comprising:
        an analyzer vessel configured to receive a portion of the multi-phase mixture;
        a second power unit electrically connected to one or more electrodes disposed inside the analyzer vessel; and
        sensors coupled with the analyzer vessel, the sensors configured to sense properties of the portion of the multi-phase mixture inside the analyzer vessel when power is supplied to the one or more electrodes disposed inside the analyzer vessel; and
    a controller coupled with the separator vessel and the electrical analyzer, the controller configured to adjust operation of the separator based on the properties sensed by the sensors of the electrical analyzer.

2. The separator of claim 1, wherein the electrical analyzer further comprises:
    an analyzer inlet coupled between the separator vessel and the analyzer vessel; and
    an analyzer outlet coupled between the separator vessel and the analyzer vessel.

3. The separator of claim 1, wherein the second power unit is a time-varying voltage analyzer power unit.

4. The separator of claim 2, further comprising a source of chemical separation aid coupled to the analyzer inlet.

5. The separator of claim 4, wherein the analyzer vessel has a second analyzer outlet, and wherein the separator further comprises a quality analyzer coupled to at least one of the analyzer outlet and the second analyzer outlet.

6. The separator of claim 5, wherein the controller is operatively coupled to the first power unit, the second power unit, and the quality analyzer, and wherein the controller is configured to adjust operation of the first power unit based on signals from the second power unit and the quality analyzer.

7. The separator of claim 1, wherein the second power unit is a time-varying voltage analyzer power unit, and wherein a composition analyzer is coupled to an analyzer outlet of the analyzer vessel.

8. The separator of claim 1, further comprising a quality analyzer coupled to at least one of the first separator outlet or the second separator outlet, wherein the controller is operatively coupled to the first power unit and the quality analyzer.

9. The separator of claim 8, wherein the controller is configured to adjust the operation of the separator based on signals from the second power unit and the quality analyzer.

10. The separator of claim 9, wherein the controller is configured to include a model relating performance of the second power unit to performance of the separator.

11. The separator of claim 7, wherein the electrical analyzer has an analyzer inlet coupled between a port formed in the separator inlet and the analyzer vessel.

12. The separator of claim 11, wherein the analyzer outlet is coupled between the analyzer vessel and a second port formed in the separator inlet.

13. The separator of claim 12, wherein the controller is coupled to the first power unit and the second power unit and the controller is configured to control operation of the first power unit based on signals from the second power unit.

14. The separator of claim 13, further comprising a quality analyzer coupled to at least one of the first separator outlet and the second separator outlet, wherein the controller is further coupled to the quality analyzer and the controller is configured to control the operation of the first power unit based also on signals from the quality analyzer.

15. The separator of claim 1, wherein the first power unit is also electrically connected to a wall of the separator vessel, such that the wall of the separator vessel operates as an electrode.

16. The separator of claim 1, wherein the second power unit is also electrically connected to a wall of the analyzer vessel, such that the wall of the analyzer vessel operates as an electrode.

17. The separator of claim 1, wherein the sensors include electrical sensors configured to sense electrical properties of the portion of the multi-phase mixture.

18. The separator of claim 17, wherein the electrical sensors are coupled to electrical conduits extending from the second power unit to the analyzer vessel, the electrical sensors configured to sense electrical loads.

19. The separator of claim 17, wherein the electrical sensors are coupled to the analyzer vessel to sense an electrical response of the portion of the multi-phase mixture in the analyzer vessel.

20. A separator for separating a multi-phase mixture into different liquid phases, the separator comprising:
a separator vessel configured to separate the multi-phase mixture into a first liquid phase and a second liquid phase;
a separator inlet configured to receive the multi-phase mixture, the separator inlet coupled with the separator vessel to convey the multi-phase mixture to the separator vessel;
a first separator outlet coupled with the separator vessel to output the first liquid phase of the multi-phase mixture, the first liquid phase including an aqueous fluid;
a second separator outlet coupled with the separator vessel to output the second liquid phase of the multi-phase mixture, the second liquid phase including a hydrocarbon fluid;
a first power unit electrically connected to one or more electrodes within the separator vessel to create an electric field in the separator vessel to separate the multi-phase mixture in the separator vessel into the first liquid phase and the second liquid phase;
an electrical analyzer configured to analyze properties of the multi-phase mixture, the electrical analyzer coupled with the separator inlet for obtaining and returning a portion of the multi-phase mixture, the electrical analyzer comprising:
an analyzer vessel configured to receive the portion of the multi-phase mixture;
a second power unit electrically connected to one or more electrodes disposed inside the analyzer vessel to create an electric field in the analyzer vessel when the portion of the multi-phase mixture is in the analyzer vessel; and
sensors coupled with the analyzer vessel, the sensors configured to sense properties of the portion of the multi-phase mixture inside the analyzer vessel when power is supplied to the one or more electrodes disposed inside the analyzer vessel; and
a controller coupled with the separator vessel and the electrical analyzer, the controller configured to adjust operation of the separator based on the properties sensed by the sensors of the electrical analyzer.

21. The separator of claim 20, wherein the electrical analyzer further comprises:
an analyzer inlet coupled with the separator inlet and the analyzer vessel for obtaining the portion of the multi-phase mixture from the separator inlet and depositing the portion of the multi-phase mixture in the analyzer vessel; and
an analyzer outlet coupled with the analyzer vessel and the separator inlet for returning the portion of the multi-phase mixture from the analyzer vessel to the separator inlet after the sensors have sensed the properties of the portion of the multi-phase mixture.

22. The separator of claim 21, wherein the analyzer inlet and the analyzer outlet are coupled with the separator inlet upstream of the separator vessel.

23. The separator of claim 20, further comprising a source of chemical separation aid coupled with the separator inlet.

24. The separator of claim 20, further comprising a quality analyzer coupled with the separator inlet, wherein the controller is operatively coupled to the first power unit, the second power unit, and the quality analyzer to adjust operation of the first power unit based on signals from the second power unit and the quality analyzer.

25. The separator of claim 20, further comprising a quality analyzer coupled to the first separator outlet or the second separator outlet, wherein the controller is operatively coupled to the first power unit and the quality analyzer to adjust the operation of the separator based on signals from the second power unit and the quality analyzer.

\* \* \* \* \*